United States Patent [19]

Usui

[11] Patent Number: 5,447,773
[45] Date of Patent: Sep. 5, 1995

[54] HONEYCOMB BODY

[75] Inventor: Masayoshi Usui, Shizuoka, Japan

[73] Assignee: Usui Kokusai Sangyo Kabushiki Kaisha, Ltd., Shizuoka, Japan

[21] Appl. No.: 194,446

[22] Filed: Feb. 10, 1994

[30] Foreign Application Priority Data

Feb. 23, 1993 [JP] Japan .................................. 5-056348

[51] Int. Cl.⁶ .............................................. B32B 3/12
[52] U.S. Cl. ..................... 428/116; 52/793.1
[58] Field of Search ............... 428/116, 118, 188; 52/806

[56] References Cited

U.S. PATENT DOCUMENTS 2,944,716  7/1960  Hoogstoel ..................... 428/184 X
3,672,022  6/1972  York ............................. 428/116 X
4,923,109  5/1990  Cyron ........................... 428/116 X

FOREIGN PATENT DOCUMENTS 2-171232  7/1990  Japan ................................ 428/116

Primary Examiner—Henry F. Epstein
Attorney, Agent, or Firm—Lowe, Price, LeBlanc & Becker

[57] ABSTRACT

A honeycomb body for supporting thereon an exhaust gas cleaning catalyst has a honeycomb structure constructed of at least one planar band and at least one corrugated band. One of the planar and corrugated bands has been replaced by a wire arrangement of a desired width. The wire arrangement is formed of wires of a desired length arranged side by side in the direction of the width of the wire arrangement.

20 Claims, 4 Drawing Sheets

HONEYCOMB BODY

BACKGROUND OF THE INVENTION

1. Field of the Invention

This invention relates to a metal-made honeycomb body, which is adapted to support thereon an exhaust gas cleaning catalyst and is generally used in an exhaust gas purifying system of an automotive vehicle.

More specifically, this invention is concerned with an economical honeycomb body excellent in properties such as durability and featuring the use of one or more wire arrangements, each of which is formed of wires, in place of a like number of conventional, costly, heat-resistant planar band(s) or corrugated band(s).

2. Description of the Related Art

Known catalyst supports of the above-described type for exhaust gas cleaning systems include two types, one being ceramic monolithic supports making use of a ceramic material such as cordierite and the other metallic monolithic supports made of a metal.

Especially in recent days, a great deal of research and development work has been being concentrated on metal-made monolithic supports with a view toward improving their drawbacks, in other words, from the viewpoints of mechanical strength, durability, flow resistance, cleaning efficiency (size reduction) and the like.

A metal-made catalyst support of the type described above, which may hereinafter be called a "metal support" for the sake of brevity, is constructed as shown in FIG. 4 or FIG. 5, that is, by a metal-made honeycomb structure H (which may hereinafter be called the "metal-made honeycomb body" or simply the "honeycomb body") and a cylindrical metal casing 4 opening at opposite ends thereof and fixedly enclosing the honeycomb body H therein. In general, the honeycomb body H is fabricated by stacking a planar band 1, which is made of a heat-resistant steel sheet, and a corrugated band 2, which has been formed by corrugating a similar heat-resistant steel sheet, one over the other in a mutually continuous relation, and then rolling them together into a spiral form or by alternately stacking such planar bands 1 and corrugated bands 2 one over the other into a multilayered form, so that the honeycomb body H defines a number of network-patterned, axial gas flow passages (hereinafter called "cells") for permitting passage of exhaust gas therethrough.

Incidentally, FIG. 4 illustrates the rolled honeycomb body H while FIG. 5 depicts the stacked honeycomb body H.

The honeycomb body and the metal casing are then firmly fixed together by brazing or welding them so that the honeycomb body can withstand thermal expansions and thermal stresses—which occur due to the high temperature of exhaust gas itself and an exothermic reaction of the exhaust gas by the exhaust gas cleaning catalyst—and also extreme vibrations during running of the automotive vehicle. Needless to say, each planar band and its associated corrugated band, which form the honeycomb body, can be fixed together at areas of contact therebetween by various methods.

As the planar band(s) 1 and the corrugated band(s) 2 in the above-described conventional honeycomb body H, it is possible to use bands having a thickness not greater than 0.1 mm and made of a material such as heat-resistant stainless steel, e.g., chromium steel (chromium content: 13–25%) or Fe-20%Cr-5%Al, or stainless steel formed by adding one or more rare earth meal to the former stainless steel to improve the high-temperature oxidation resistance. Al-containing steel bands are extremely preferred, because they have improved high-temperature oxidation resistance and, when subjected to heat treatment, $\alpha$-$Al_2O_3$ is caused to deposit in various forms such as whisker and mushroom forms on their surfaces and can serve to firmly hold a wash coat capable of carrying exhaust gas cleaning catalysts such as Pt, Pd and Rh.

The planar bands 1 and corrugated bands 2, which make up the metal-made honeycomb body H, are however extremely costly, thereby reducing the price competitive power of the metal-made honeycomb body compared with ceramic-made honeycomb bodies.

SUMMARY OF THE INVENTION

An object of the present invention is to derive a cost merit by replacing some of conventional bands with a like number of wire arrangements, each comprising wires, in a metal-made honeycomb body constructed using the conventional high-price bands described above and also to provide a honeycomb body having better performance than those formed using conventional bands.

In one aspect of the present invention, there is also provided a honeycomb body for supporting thereon an exhaust gas cleaning catalyst. The honeycomb body is of a honeycomb structure constructed of at least one planar band and at least one corrugated band. One of the planar and corrugated bands has been replaced by a wire arrangement having a desired width and comprising wires of a desired length arranged side by side in the direction of the width of the wire arrangement.

Owing to the construction described above, the honeycomb body according to the present invention can exhibit the following superb effects:

(i) Because of the use of the wire arrangement in place of the conventional band, its individual wires can effectively absorb and reduce deforming force to be produced based on large thermal stress applied during use of the honeycomb body so that the honeycomb body can show excellent durability.

(ii) The use of the wire arrangement in place of the conventional band also makes it possible to form exhaust gas into turbulent flows between the adjacent wires, whereby the efficiency of contact between the exhaust gas and the supported catalyst can be improved, leading to an improvement in cleaning ability.

(iii) Conventional bands are extremely costly. The wire arrangement employed in the present invention, on the other hand, is economical and can hence bring about a cost merit.

DETAILED DESCRIPTION OF THE INVENTION AND PREFERRED EMBODIMENTS

The honeycomb body according to the first embodiment of the present invention will now be described with reference to FIG. 1.

A honeycomb element HE, which is to be formed into the honeycomb body H of the honeycomb structure (see FIG. 4 or 5), is constructed of a wire arrangement W and a corrugated band 2 arranged in a mutually contiguous relation. In the present invention, the honeycomb element HE can be formed into various shapes like the rolled and stacked honeycomb bodies H shown in FIG. 4 and FIG. 5, respectively. In addition to the rolled and stacked types described above, the honeycomb element can also be formed into shapes known in the present field of art such as a radial shape, an S shape, a shape formed of two huge commas so united as to make a perfect circle, and an X-wrapped (swastika-patterned) shape.

Figure 1:
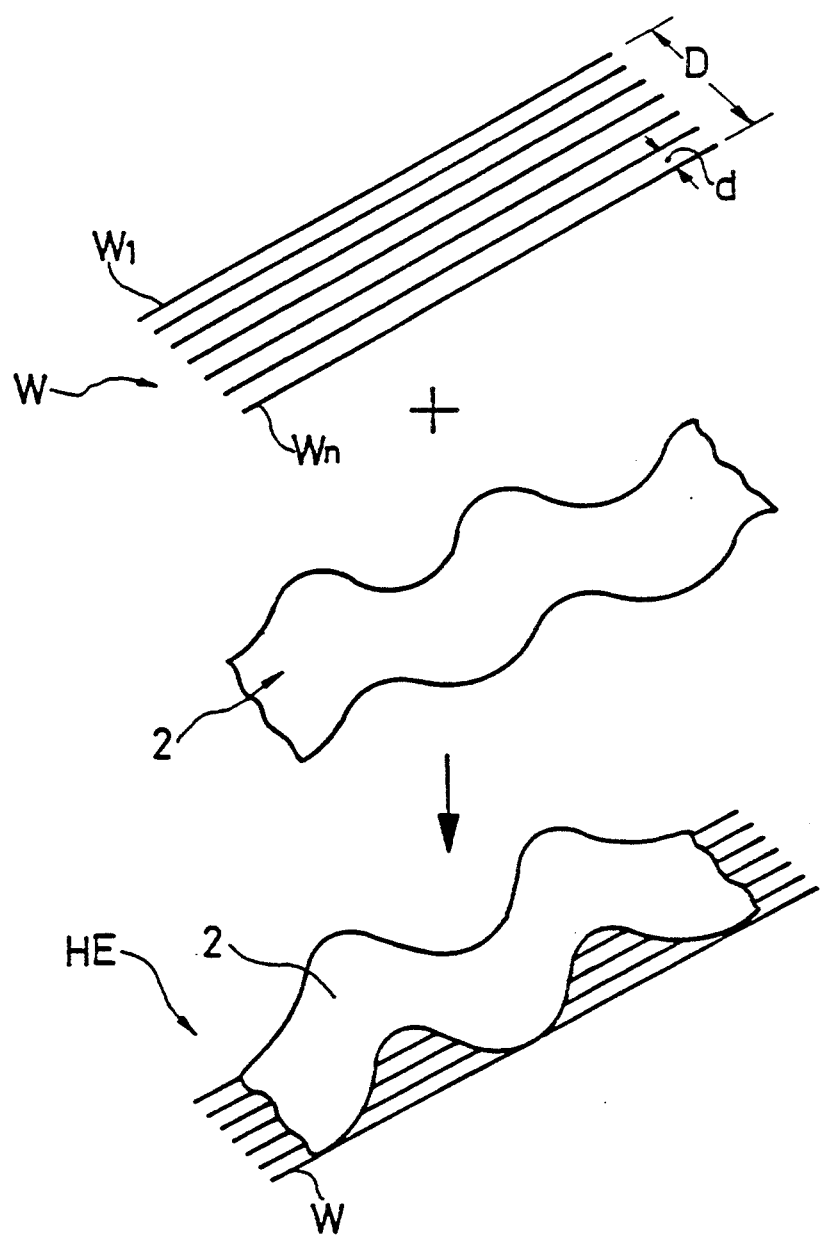
FIG. 1 schematically illustrates a combination of a corrugated band and a wire arrangement in a honeycomb body according to a first embodiment of this invention.

The wire arrangement W is formed by, as shown in FIG. 1, arranging a desired number of wires $W_1$-$W_n$ of a desired length at a desired interval d in the direction of a width of the wire arrangement so that the wire arrangement has a desired width D.

As the wires $W_1$-$W_n$, it is desired to use those made of a material having properties comparable with the above-described planar band or corrugated band used in honeycomb bodies of the above type, that is, of a material excellent in high-temperature oxidation resistance. Illustrative usable wires include those made of Fe-20%Cr-5%Al or those made of an alloy formed by adding one or more rare earth metals to Fe-20%Cr5%Al.

The wires $W_1$-$W_n$ can have a diameter similar to the thickness of the bands. In general, wires of 0.05-0.3 mm in diameter are used.

The cross-sectional shape of each wire is generally circular but can also be in the form of a non-circular shape such as an oval, a polygon or a rectangle. Wires having these shapes, respectively, can also be used in combination.

Further, the wires $W_1$-$W_n$ can be arranged not only at the interval d as shown in FIG. 1 but also in close contact with one another. Further, the wires $W_1$-$W_n$ can also be arranged by varying the interval d.

As the corrugated band 2, it is possible to use any known corrugated band which is employed in a honeycomb body of the above-described type. The material of the band of the above-described type is as described above under the Description of the Related Art.

A fabrication method of the honeycomb element HE shown in FIG. 1 will next be described with reference to FIG. 2.

Figure 2:
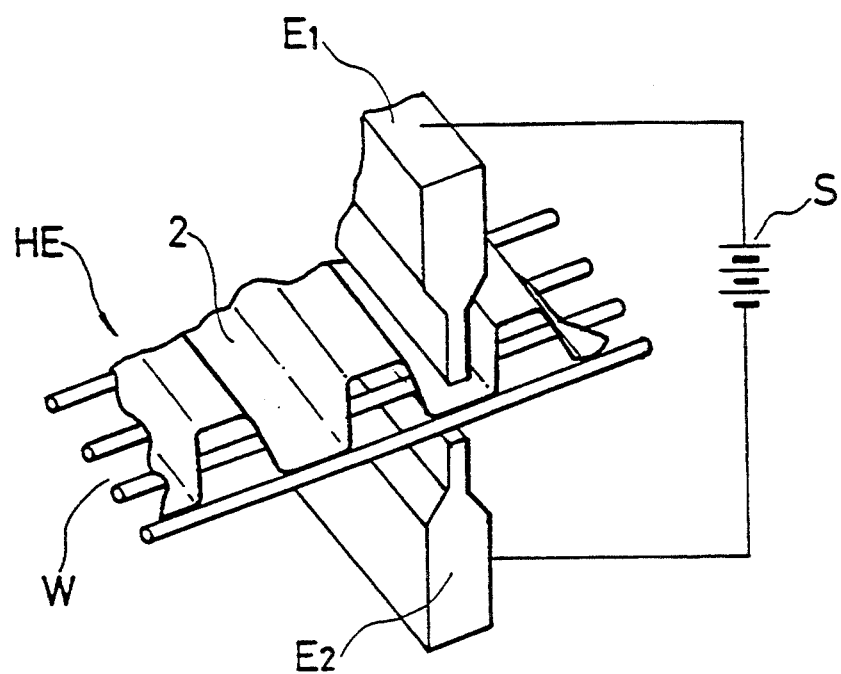
FIG. 2 schematically shows a method for fixing the corrugated band and the wire arrangement by electric welding.

To fabricate the honeycomb element HE, the wire arrangement W—in which the arranged individual wires $W_1$-$W_n$ have been temporarily held together or not—and the corrugated band 2 are, as shown in FIG. 2, stacked in a mutually contiguous relation, held between upper and lower electrode materials $E_1$,$E_2$, and electrically welded together at desired areas of contact therebetween. This type of electric welding method has already been established as a technique for the fabrication of wire condensers and the like and makes it possible to economically and efficiently fabricate the honeycomb element HE. Incidentally, letter S indicates a power supply in FIG. 2.

Upon fabrication of the honeycomb element HE in the present invention, it is unnecessary to fixedly secure all the areas of contact between both the bands by electrical welding or the like over the entire width or length of the honeycomb element HE. Needless to say, both the bands may be welded together at selected crest or trough of the waveform of the corrugated band along the length thereof.

Further, it is obviously possible to fixedly secure both the bands at desired areas of contact therebetween by brazing instead of welding or by using brazing and welding in combination upon fabrication of the honeycomb element HE.

In addition, needless to say, the wire arrangement W and the corrugated band 2 can also be fixedly secured together at desired areas of contact therebetween by electric welding or arc welding, for example, while rolling them into a spiral form upon fabrication of the honeycomb element HE.

Figure 3:
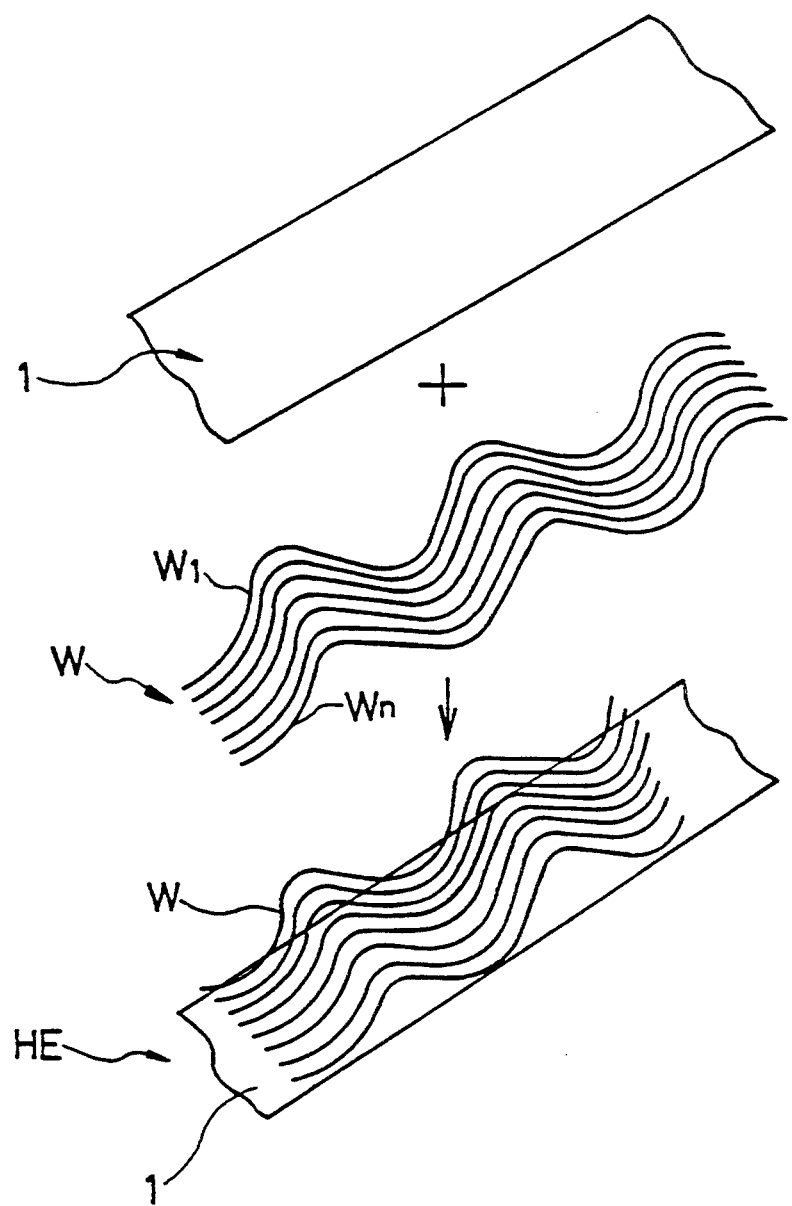
FIG. 3 schematically depicts a combination of a planar band and a corrugated wire arrangement in a honeycomb body according to a second embodiment of this invention.

Referring next to FIG. 3, a description will be made of the honeycomb body according to the second embodiment of the present invention. The honeycomb body is formed of a honeycomb element HE, which is in turn formed of a corrugated wire arrangement W and a planar band 1 disposed in a mutually contiguous relation. The honeycomb element HE in the honeycomb body according to the second embodiment is different from that in the honeycomb body according to the first embodiment in that the corrugated band 2 has been replaced by the corrugated wire arrangement W. The remaining technical features such as fixing means and method are common to them.

In each of the first and second embodiments of the present invention, the honeycomb body H is fabricated with a desired structure by using the corresponding honeycomb element HE.

For example, the honeycomb body H of the first embodiment can be fabricated in a rolled form from the corresponding honeycomb element HE as will be described next.

(i) As the corrugated band 2, is used a corrugated band made of heat-resistant steel of Fe-20%Cr-5%Al-0.02%Ce and having 0.04 mm thickness, 38 mm width, 3.0 mm wavelength and 1.4 mm waveheight.

(ii) As the wire arrangement W on the other hand, wires having 0.1 mm diameter and made of the same heat-resistant steel as the above-described corrugated band are arranged side by side at an equal interval of 0.5 mm in the direction of the width of the wire arrangement and are held together temporarily.

(iii) The corrugated band and the wire arrangement are electrically welded together into the honeycomb element HE in the manner illustrated in FIG. 2. An end portion of the honeycomb element HE is inserted in a slit of a slitted rolling rod (i.e., a rolling jig). The honeycomb element HE, that is, the corrugated band and the wire arrangement are then rolled together into a multi-layered structure, thereby forming a honeycomb body H having an outer diameter of 70 mm and a cell (network-patterned gas flow passage) density of 30 cpsi (cells per square inches).

To manufacture an exhaust gas cleaning system (a metal-made catalytic converter) by having exhaust gas cleaning catalysts such as Pt, Pd and Rh carried on the honeycomb body H fabricated as described above, a usual method can be adopted.

For example, the honeycomb body H is coated at outer surfaces thereof—which include outer surfaces of the corrugated band and outer surfaces of the individual wires forming the wire arrangement—with a slurry of activated alumina ($\gamma$-$Al_2O_3$) and an alumina sol and is then subjected to heat treatment at 600° C. to form wash coat layers (catalyst carrying layers). To have catalysts such as Pt, Pd and Rh carried on each catalyst carrying layer, a usual method such as impregnation treatment is then applied.

Figure 4:
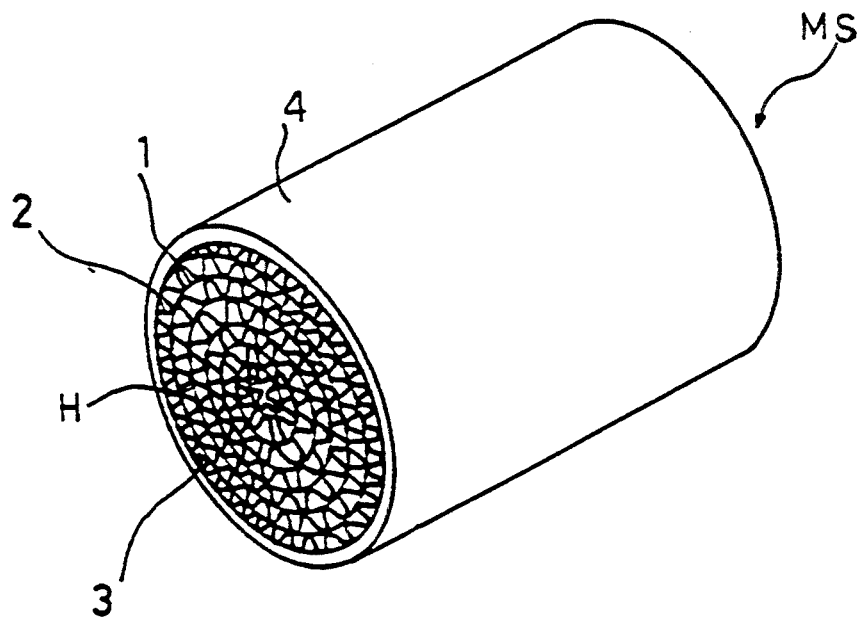
FIG. 4 is a perspective view of a conventional metal-made support of the rolled type.
Figure 5:
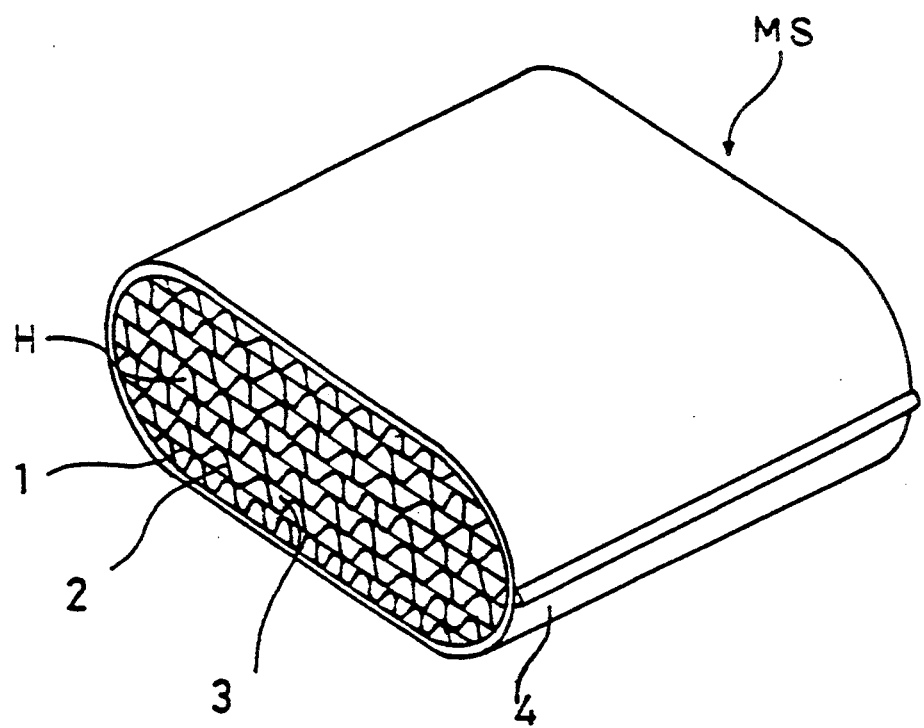
FIG. 5 is a perspective view of a conventional metal-made support of the stacked type.

Incidentally, the honeycomb body H is generally fixed in the metal casing 4 to provide a catalyst support (metal support) MS as shown in FIG. 4 or 5 and an exhaust gas cleaning catalyst is then carried as described above, whereby an exhaust gas cleaning system (metal-made catalytic converter) is fabricated.

The metallic casing 4 accommodates the honeycomb body H therein and holds it in place. No particular limitation is imposed on its shape or the like insofar as it is open at opposite ends thereof.

What is claimed:

1. In a honeycomb body for supporting thereon an exhaust gas cleaning catalyst, said honeycomb body formed of a honeycomb structure comprising at least one band having a corrugated shape and at least one wire band, said wire band further comprising a plurality of wires arranged side by side in a planar arrangement, each said wire in longitudinal alignment with said corrugated band longitudinal axis.

2. The honeycomb body according to claim 1, wherein said wires are arranged in close contact with one another.

3. The honeycomb body according to claim 1, wherein said wires are spaced apart at a desired interval.

4. The honeycomb body according to claim 1, wherein each planar wire arrangement and an adjacent corrugated band are fixedly secured together at areas of contact therebetween.

5. A honeycomb body according to claim 4, wherein said fixed securement comprises at least one of welding and brazing.

6. A honeycomb body according to claim 1, wherein said honeycomb structure comprises plural wire bands and plural corrugated bands alternately stacked one over the other.

7. A honeycomb body according to claim 6, wherein said wires are arranged in close contact with one another.

8. A honeycomb body according to claim 6, wherein adjacent said wires are spaced apart at a desired interval.

9. A honeycomb body according to claim 6, wherein each planar wire arrangement and an adjacent corrugated band are fixedly secured together at areas of contact therebetween.

10. A honeycomb body according to claim 9, wherein said fixed securement comprises at least one of welding and brazing.

11. In a honeycomb body for supporting thereon an exhaust gas cleaning catalyst, said honeycomb body formed of a honeycomb structure comprising at least one planar band and at least one wire band, said wire band further comprising a plurality of wires arranged side by side, each said wire following a smooth corrugated path having alternating crests and troughs in a direction aligned with a longitudinal axis of said planar band, each said crest and trough following said corrugated path without deviation so as to provide a continuous contact where each said crest and trough meet a portion of an adjacent planar band, adjacent wires being aligned transversely of said longitudinal axis when following said corrugated path and being joined only by said continuous contact between the planar band and the crest and trough of each said wire.

12. The honeycomb body according to claim 11, wherein said wires are arranged in close contact with one another.

13. The honeycomb body according to claim 11, wherein said wires are spaced apart at a desired interval.

14. The honeycomb body according to claim 11, wherein each said corrugated wire band and an adjacent planar band are fixedly secured together at areas of contact therebetween.

15. A honeycomb body according to claim 14, wherein said fixed securement comprises at least one of welding and brazing.

16. A honeycomb body according to claim 11, wherein said honeycomb structure comprises plural planar bands and plural corrugated wire bands alternately stacked one over the other.

17. A honeycomb body according to claim 16, wherein said wires are arranged in close contact with one another.

18. A honeycomb body according to claim 16, wherein adjacent said wires are spaced apart at a desired interval.

19. A honeycomb body according to claim 16, wherein each corrugated planar wire band and an adjacent planar band are fixedly secured together at areas of contact therebetween.

20. A honeycomb body according to claim 19, wherein said fixed securement comprises at least one of welding and brazing.

* * * * *